United States Patent
Goeb

(10) Patent No.: US 6,212,365 B1
(45) Date of Patent: Apr. 3, 2001

(54) PUSH-TO-TALK INTERFACE CIRCUIT FOR A RADIO COMMUNICATION SYSTEM

(75) Inventor: Robert Goeb, Fort Wayne, IN (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/099,716

(22) Filed: Jun. 18, 1998

(51) Int. Cl.$^7$ .................................................. H04M 11/00
(52) U.S. Cl. .............................. 455/78; 455/73; 455/83; 327/427
(58) Field of Search ................................. 455/73, 78, 91, 455/116, 95, 107, 231, 83; 327/427, 434, 435, 81, 581; 370/296

(56) References Cited

U.S. PATENT DOCUMENTS

| | | | |
|---|---|---|---|
| 5,430,401 | * 7/1995 | Shtulman | 327/434 |
| 5,444,400 | * 8/1995 | Hall et al. | 327/111 |
| 5,475,329 | * 12/1995 | Jones et al. | 327/110 |
| 5,801,550 | * 9/1998 | Tanaka et al. | 327/110 |
| 5,818,283 | * 10/1998 | Tonami et al. | 327/436 |
| 5,959,475 | * 9/1999 | Zomorrodi | 327/437 |

* cited by examiner

Primary Examiner—Doris H. To
(74) Attorney, Agent, or Firm—Saul Elbaum

(57) ABSTRACT

There is disclosed a circuit for selectively enabling communications by providing an output signal voltage of a first level indicative of a first transmission state and a second level corresponding to a second non-transmission state, the circuit having an FET having a gate, source, and drain, the source coupled to a first controlling means for providing a voltage Vs to the source, the drain coupled to an output terminal of the circuit for providing the output signal, and the gate coupled to a second control means for providing a voltage Vg to the gate, the FET operable in a first conducting mode when a gate to source voltage Vgs exceeds a predetermined threshold, indicative of a non-zero crossing amplitude region of an input voltage signal, to cause the output signal voltage to be at the second level corresponding to the non-transmission state, and in a second non-conducting mode, wherein the Vgs of the FET is less than the threshold, indicative of a zero-crossing of the input signal, for causing the output signal voltage to go to the first level, indicative of the transmission state, wherein the first and second control means responsive to the input voltage signal operate to vary the FET gate to source voltage and route current through the circuit to cause the FET to operate in the conducting and non-conducting modes.

31 Claims, 4 Drawing Sheets

PUSH-TO-TALK INTERFACE CIRCUIT FOR A RADIO COMMUNICATION SYSTEM

FIELD OF THE INVENTION

This invention relates generally to interface circuits for communication systems and, more particularly to an interface circuit for a push-to-talk radio having a single transistor and a minimal number of components for providing an indication to the radio to initiate transmission.

BACKGROUND OF THE INVENTION

Devices such as tactical radios often use an indicator signal to command the radio to begin transmission. The most common method of accomplishing this command is to provide a mechanical switch on the radio's handset. This switch provides an electrical signal to the radio to begin transmission. In other applications, this Push-to-Talk (PTT) signal is generated either electronically or electromechanically (via a relay).

The normal signaling protocol is for a closure to ground (zero volts) to command 'transmit'. The command "don't transmit" is exemplified by an open circuit or via a high potential voltage or low voltage across the terminals of a circuit.

Due to the nature of how PTT signals are generated, with mechanical switches and electromechanical relays, there is often significant noise and high-voltage ringing present on PTT lines. In some applications, significant Lengths of cable are present on the PTT line providing additional opportunity for high voltage transients and noise to infiltrate the PTT interface.

Previous designs of PTT interfaces have used circuits with high cost components or large numbers of components. FIG. 3 shows the traditional design used in the present production of a push-to-talk SINCGARS radio. As shown in FIG. 3, such design requires 2 transistors ($Q_1, Q_2$) and 13 total components including a power supply. FIG. 4 shows another prior art implementation of a PTT interface. This design, while requiring only nine components, however, further includes a costly differential amplifier 100 and also requires both a positive supply V2 and negative supply voltage V3 to operate. The high component count, high cost, and the need for negative supply voltages associated with prior art PTT interface circuits make it extremely desirable to obtain a low cost, low power interface circuit which is operable with a minimal number of components.

As can be seen in FIG. 1, the design according to the present invention overcomes these shortcomings by the judicious use of a single, low cost field effect transistor. Current routing with diodes precludes the need for a negative supply voltage.

SUMMARY OF THE INVENTION

A circuit for selectively enabling communications by providing an output signal voltage of a first level indicative of a first transmission state and a second level corresponding to a second non-transmission state, the circuit comprising an FET having a gate, source, and drain, the source coupled to a first controlling means for providing a voltage Vs to the source, the drain coupled to an output terminal of the circuit for providing the output signal, and the gate coupled to a second control means for providing a voltage Vg to the gate, the FET operable in a first conducting mode when a gate to source voltage Vgs exceeds a predetermined threshold, indicative of a non-zero crossing amplitude region of an input voltage signal, to cause the output signal voltage to be at the second level corresponding to the non-transmission state, and in a second non-conducting mode, wherein the Vgs of the FET is less than the threshold, indicative of a zero-crossing of the input signal, for causing the output signal voltage to go to the first level, indicative of the transmission state, wherein the first and second control means responsive to the input voltage signal operate to vary the FET gate to source voltage and route current through the circuit to cause the FET to operate in the conducting and non-conducting modes.

BRIEF DESCRIPTION OF THE DRAWINGS

The invention, together with further objects and advantages thereof, may best be understood by reference to the following description taken in connection with the accompanying drawings in which.

DETAILED DESCRIPTION OF THE INVENTION

Figure 1:
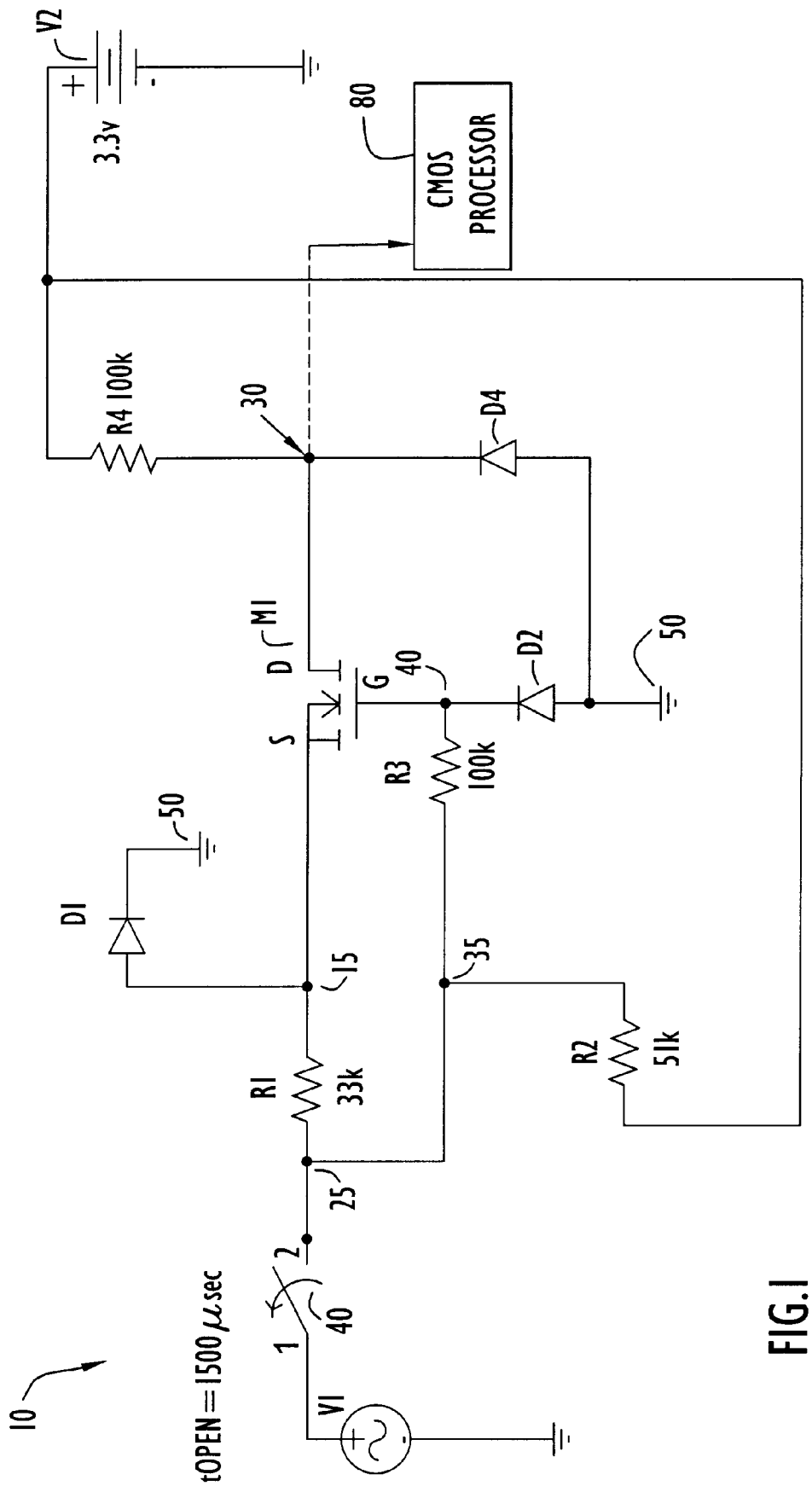
FIG. 1 is a schematic illustration of the push-to-talk interface circuit according to the present invention.

Referring now to FIG. 1, there is shown a particular embodiment of the push-to-talk (PTT) interface circuit 10 according to the present invention. In FIG. 1, input voltage generator V1 and switch 90 represent the mechanism generating the PTT input 20. Such input may be implemented via a mechanical switch, an electromechanical relay or a semiconductor device, for example. The output of the circuit is represented by reference numeral 30. Using conventional signaling protocol, below are listed the possible input conditions at terminal 20 and desired output conditions at terminal 30:

| Input Condition | Desired Output Condition |
| --- | --- |
| high positive voltage | inactive (low voltage level) |
| high negative voltage | inactive (low voltage level) |
| open circuit | inactive (low voltage level) |
| ground (zero volts) | active (high voltage level) |

As shown in FIG. 1, a first resistor R1 is coupled at a first terminal 15 to the source electrode of MOSFET M1 and to the anode of diode D1, and at a second terminal 25 to the input terminal 20. The gate (G) electrode of MOSFET M1 is coupled at node 40 to a first terminal of resistor R3 and to the cathode electrode of a diode D2 positioned in a reverse bias orientation and having the anode electrode coupled to ground potential 50. The drain (D) electrode of MOSFET M1 is coupled to the output terminal 30 and to the cathode of clamping diode D4 which has its anode connected to ground 50. Pull-up resistor R4 is connected to the positive terminal of a power supply and operates, as will be described later, for pulling the output signal level at terminal 30 to a high voltage level corresponding to the power supply voltage V2. Resistor R2 is coupled between the positive terminal of the power supply V2 and the input terminal 20 via node 35. Resistor R2, for the case of an open circuit applied at input 20, operates to allow current to pass through resistor R1 and diode D1. Diode D1 has the anode coupled to terminal 15 and the cathode coupled to ground. The diode D1 provides a limiting positive voltage at the source of MOSFET M1 when the voltage at input terminal 20 is positive, and for permitting M1 to vary according to the input 20 when V1 is negative. Note that while M1 is illustrated as an n-type MOSFET, a p-type MOSFET may also be used in configuring the circuit. The diodes and voltages are adjusted accordingly.

The operation of circuit 10 will now be described with the various input conditions at input terminal 20 mentioned above. Note that while exemplary numerical values have been assigned to each of the electronic components, other values may be used and tailored according to the particular application.

Case a) In the case where switch 90 is closed and input 20 is represented by a high positive input voltage from input signal generator V1, current flows through resistor R1 and diode D1 to ground 50. This clamps the source S of MOSFET M1 at one diode drop or approximately 0.7 volts above ground potential. The input voltage 20 is applied to the gate of M1 through R3, making the voltage level at the gate of M1 approximately equal to the input voltage (diode D1 is reverse biased). When the gate to source voltage of M1 exceeds 1 to 2 volts positive, M1 conducts making the drain of M1 approximately 0.7 volts (source voltage). The signal at the drain of M1 (reference numeral 30) is the output of the PTT circuit and may be input into standard 3.3 volt CMOS digital circuit, as indicated by module 80. In this configuration, D4 and D2 are reverse biased and of no consequence in the circuit 10.

Case b) In the case where switch 90 is closed and input 20 is represented by a high negative voltage input from input signal generator V1, the negative voltage is applied to the source of M1 through R1 (diode D1 is reverse biased). This places the source of M1 approximately at the input voltage 20. Also, current flows through D2 and R3 to the input clamping the voltage at the gate (G) of M1 to one diode drop below ground or approximately −0.7 v. When the gate to source voltage Vgs of M1 exceeds 1 to 2 volts positive, M1 conducts making the drain of M1 approximately −0.7 volts. The signal at the drain D of M1 (reference numeral 30) is the output of the PTT circuit and may be input into standard 3.3 volt CMOS digital circuits. In this case, diode D1 is reverse biased and of no consequence in this condition. Diode D4 operates to clamp the output of the circuit to one diode drop below ground or approximately −0.7 v. This is compatible with a standard 3.3 v CMOS digital circuit.

Case c) In the case where switch 90 is closed and input 20 is represented by an input voltage of zero volts from input signal generator V1, both the gate G and source S of M1 are approximately at zero volts and M1 is in the "off" or non-conducting state. In this case, resistor R4 pulls the output 30 up to the V2 supply voltage of 3.3 v, providing a logic '1' output at terminal 30 (diode D4 is reverse biased). This signal input to CMOS digital processor 80 thus operates as a signal indicator to notify the digital circuit in a push-to-talk radio, for instance, to begin transmission of communications.

Case d) In the case where switch 90 is open and thus, input 20 is represented by an open circuit input, resistor R2 and R1 provide a high positive voltage to the gate G of M1. Diode D1 is forward biased through resistors R2 and R1, thus providing +0.7 v to the source S of M1. M1 then turns on, providing a logic '0' output from the circuit at the drain D indicative of a +0.7 v output at terminal 30.

Figure 2:
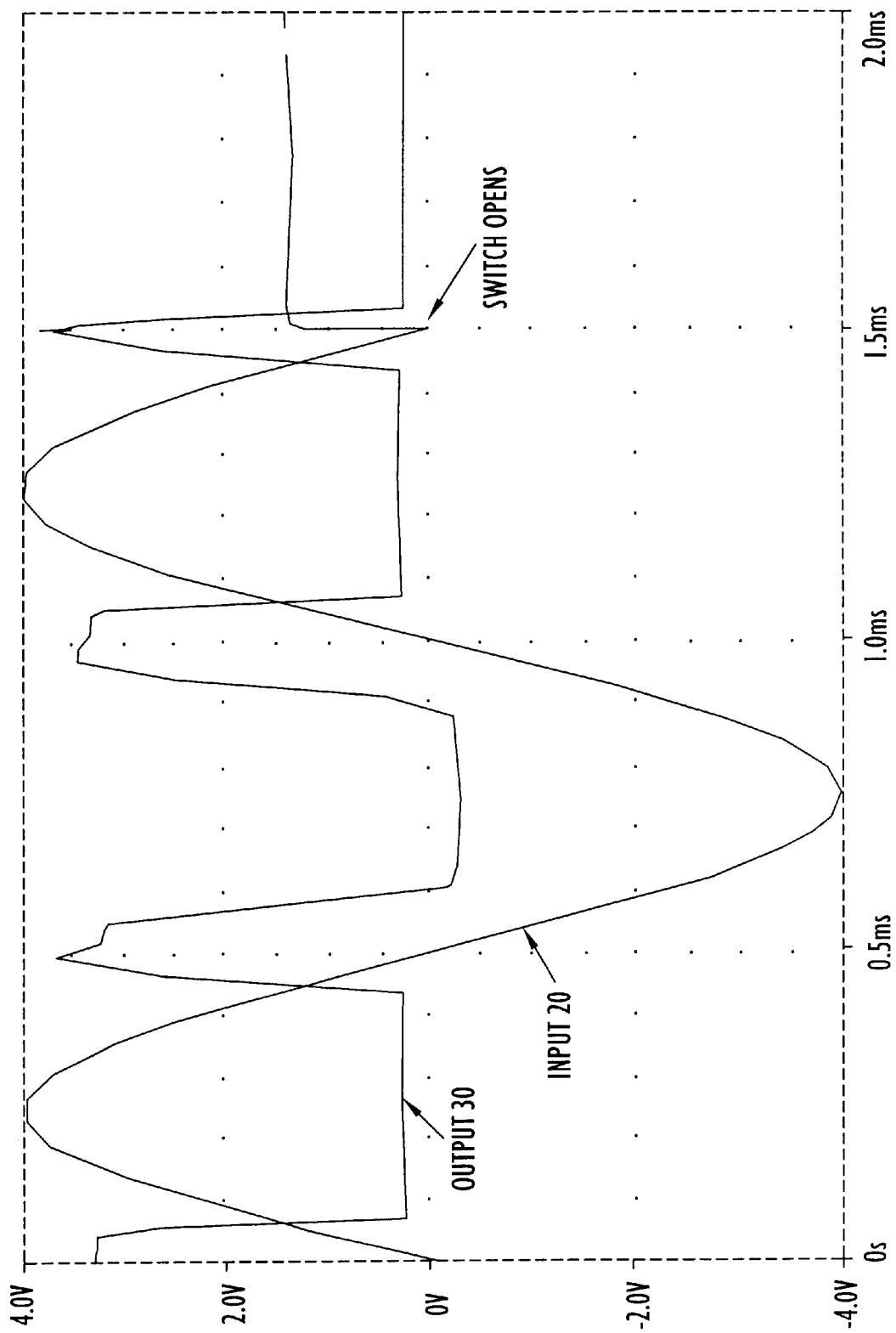
FIG. 2 is a graphical representation of the output voltage signal in response to input voltage conditions as a function of time in the embodiment of FIG. 1.
Figure 3:
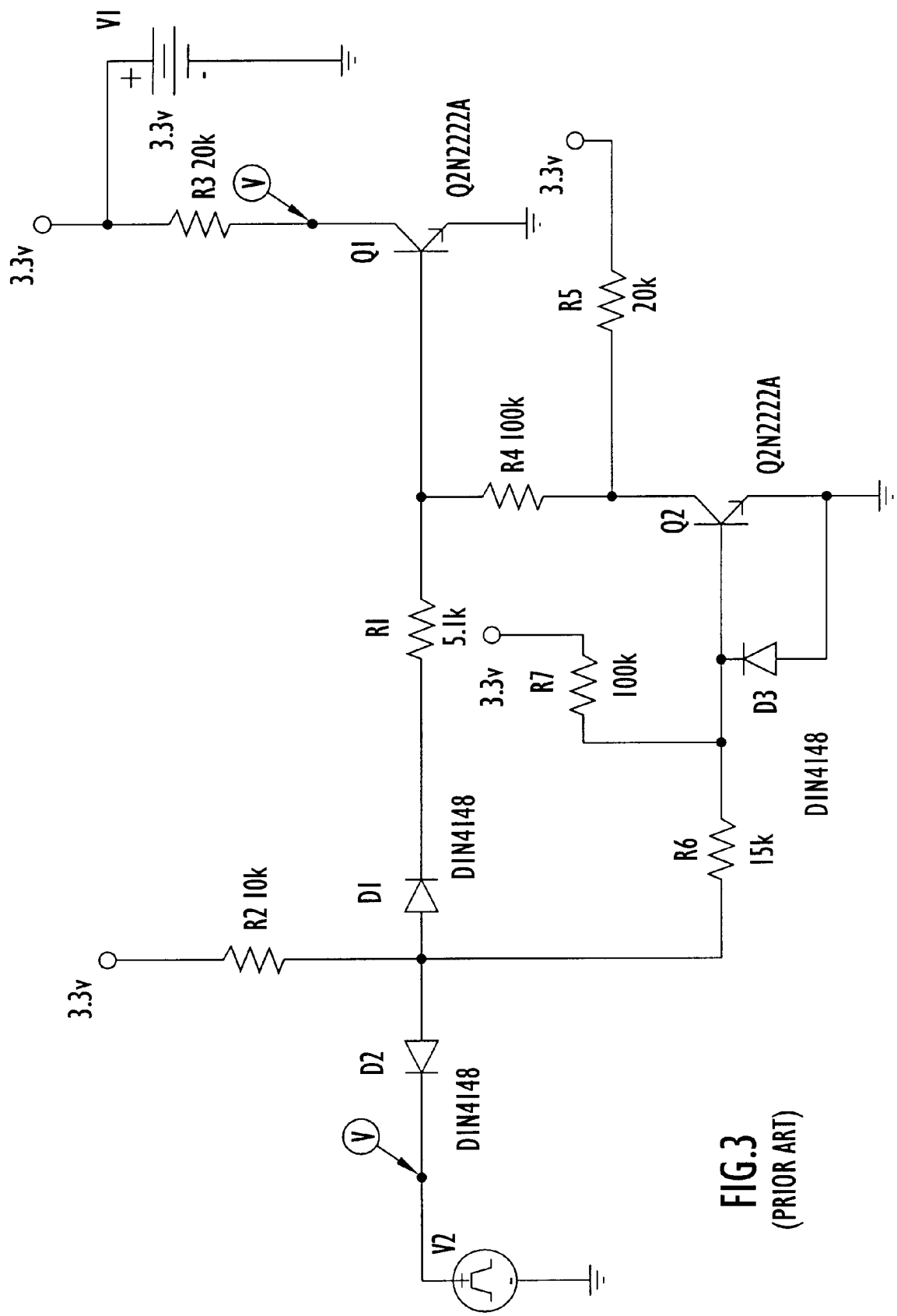
FIG. 3 is a prior art schematic of a push-to-talk circuit.
Figure 4:
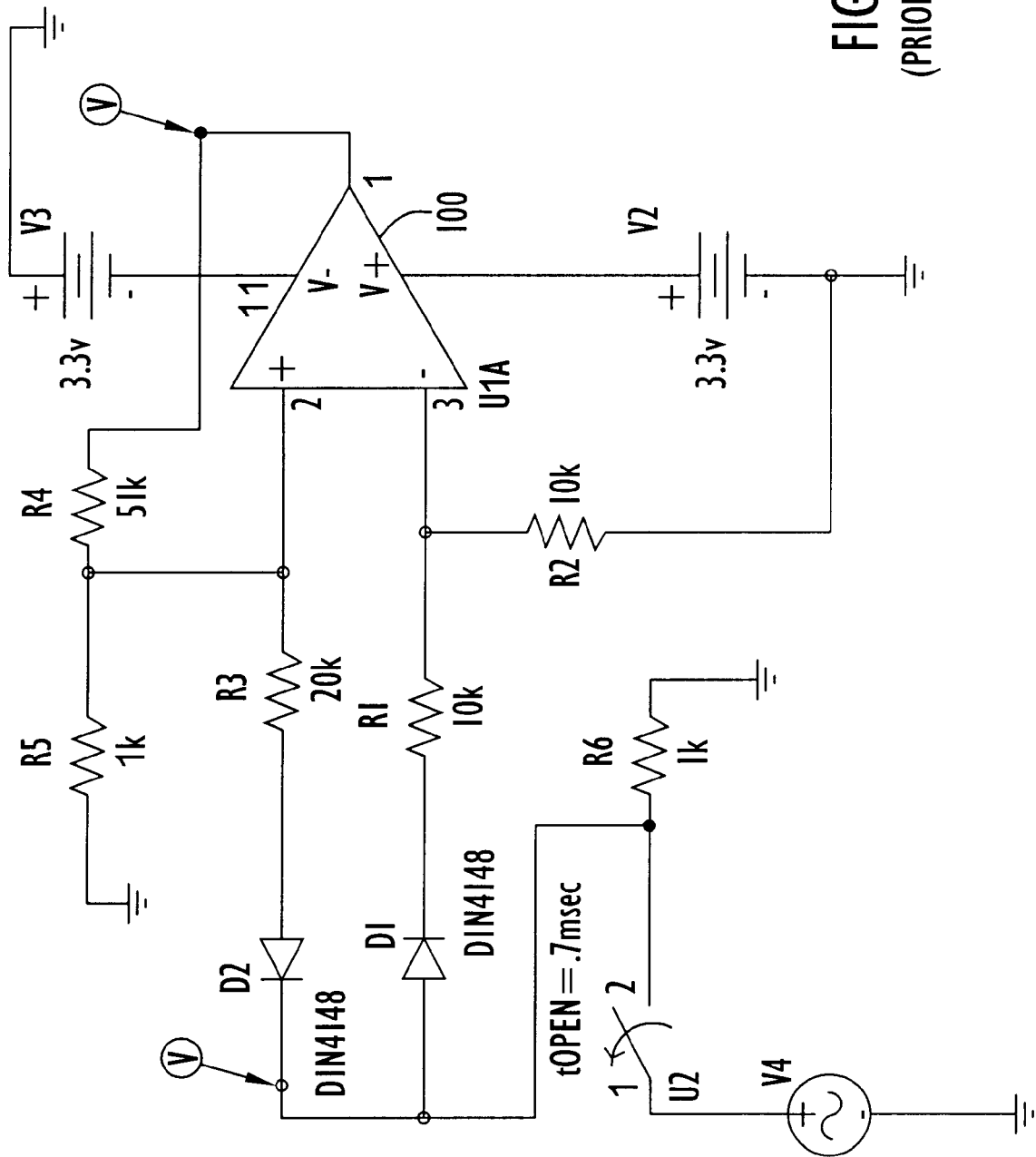
FIG. 4 is a second prior art schematic of a push-to-talk circuit.

FIG. 2 provides a graphical representation of the various conditions described above. These conditions were modeled and tested using Microsim version 7.1. An 8 vp-p sine wave was used as input for 1.5 msec. At that point, a switch was then opened to simulate an open circuit condition.

The aforementioned circuit is applicable to any situation where a mechanical or electromechanical device needs to interface to a low voltage digital logic circuit. Such applications include but are not limited to radio push to talk circuits, relay circuits, and inductive interfaces. It should be understood that a person may make many variations and modifications to the embodiments utilizing functionally equivalent elements to those described herein. Any and all such modifications as well as others which may become apparent to those skilled in the art, are intended to be included within the scope of the invention as defined by the appended claims.

What is claimed is:

1. Circuit for selectively enabling communications by providing an output signal voltage of a first level indicative of a first transmission state and a second level corresponding to a second non-transmission state according to the magnitude and polarity of an applied input signal voltage, said circuit comprising:

a FET having gate, source, and drain electrodes, said source electrode coupled to a first control means for providing an input voltage Vs to said source, said drain electrode coupled to an output terminal of said circuit for providing said output signal, and said gate electrode coupled to a second control means for providing a voltage Vg to said gate, said FET operable in a first conducting mode when a gate to source voltage Vgs exceeds a predetermined threshold, indicative of a non-zero crossing amplitude region of said input signal voltage, to cause said output signal voltage to be at said second level corresponding to the non-transmission state, and in a second non-conducting mode, wherein said Vgs of said FET is less than said threshold, indicative of a zero-crossing of said input signal voltage, for causing said output signal voltage to be at said first level, indicative of said transmission state, wherein said first and second control means responsive to said input voltage signal operate to vary said FET gate to source voltage for controlling current paths through said circuit to cause said FET to selectively operate in said conducting and non-conducting modes according to the magnitude and polarity of the input signal voltage.

2. The circuit according to claim 1, wherein the non-zero crossing amplitude region of said input signal voltage is selected from the group consisting of a high positive input voltage, a high negative input voltage, and an open circuit voltage.

3. The circuit according to claim 2, wherein said second level of output signal voltage is between −0.7 volts and 0.7 volts and wherein said first level of said output voltage signal is 3.3 volts.

4. The circuit according to claim 2, wherein said FET is a MOSFET.

5. The circuit according to claim 4, wherein said predetermined threshold is between 1 and 2 volts.

6. The circuit according to claim 1, wherein said first control means comprises a first resistor having a first terminal coupled to an anode electrode of a diode, said diode having a cathode electrode coupled to a reference voltage.

7. The circuit according to claim 1, wherein said second control means comprises a second and third resistor coupled to one another at respective first terminals, said third resistor having a second terminal coupled to a cathode electrode of a second diode and to said gate.

8. The circuit according to claim 1, further comprising a pull up resistor coupled to said drain of said FET and to a supply voltage for pulling said output voltage signal at the output terminal to said first level when said FET is in the non-conducting mode.

9. The circuit of claim 1, wherein said FET is the only FET in the circuit.

10. In a push-to-talk radio system which uses an indicator signal to command a radio to begin transmission, an interface circuit responsive to an input stimulus for providing said output indicator signal of a first level corresponding to a transmit mode and a second level corresponding to a non-transmission mode for causing said radio to commence transmission, said interface circuit comprising:

a FET having a gate, source, and drain, said source coupled to said input stimulus via a first resistor in combination with a first diode, said gate coupled to said input stimulus via a second resistor in combination with a second diode, said drain coupled to an output terminal for providing said indicator signal, wherein said second diode is coupled between said gate and a reference potential, said second diode having a first terminal coupled to the first terminal of said second resistor and wherein a third diode is coupled between said drain and said reference potential for limiting said output indicator signal, wherein a pull-up resistor is coupled between said drain and an external supply voltage for providing said output indicator signal at said second level, and wherein said FET is operable in a first conducting mode when a gate to source voltage exceeds a predetermined threshold responsive to a first amplitude region of said input stimulus to cause said output indicator signal to be at said second level indicative of non-transmission, and in a second non-conducting mode when said gate to source voltage does not exceed the predetermined threshold in response to said input stimulus having a second amplitude region to cause said output indicator signal to be at said first level indicative of the transmission mode wherein said first, second, and third resistors, and said first and second diodes responsive to said input stimulus operate to vary said FET gate to source voltage and route said current through said circuit to cause said FET to operate in said conducting and non-conducting modes.

11. The system according to claim 10, said interface circuit further comprising a fourth resistor having a first terminal coupled to the second terminal of said second resistor and to the second terminal of said first resistor, and a second terminal coupled to the external power supply for providing a voltage to the gate of said FET sufficient to cause said Vgs to exceed said threshold to cause said FET to operate in the conducting mode such that said output signal indicator is indicative of said non-transmission mode when said input stimulus is an open circuit.

12. The system according to claim 10, wherein said output indicator signal is adapted for input to a low voltage digital processor.

13. The system according to claim 10, wherein said input stimulus comprises a high voltage positive signal operative to cause said FET to become conducting for providing said output indicator signal at said second low level corresponding to the non-transmission mode.

14. The system according to claim 10, wherein said input stimulus comprises a high negative voltage signal operative to cause said FET to become conducting for providing said output indicator signal at said second low level corresponding to the non-transmission mode.

15. The system according to claim 10, wherein said input stimulus comprises an open circuit voltage operative to cause said FET to become conducting for providing said output indicator signal at said second low level corresponding to the non-transmission mode.

16. The system according to claim 10, wherein said input stimulus comprises a zero-voltage input operative to cause said FET to become non-conducting such that said output indicator signal is at said first high level corresponding to said transmit mode.

17. The system according to claim 10, wherein said FET is a metal-oxide semiconductor FET (MOSFET).

18. The system according to claim 10, wherein said predetermined threshold is 1–2 volts.

19. The circuit of claim 10, wherein said FET is the only FET in the circuit.

20. A push-to-talk interface circuit responsive to an input stimulus having a first voltage range and a second voltage range for providing an output signal indicator to said radio indicative of a binary one corresponding to said second voltage range of said input stimulus and a binary zero corresponding to said first voltage range for causing said radio to initiate a transmission sequence upon receipt of said binary one value, said interface circuit comprising:

a transistor having a first terminal coupled to a first controlling means for providing a first terminal voltage;

a second terminal coupled to an output terminal of said circuit for providing said output indicator signal; and a third terminal coupled to a second control means for providing a second terminal voltage, wherein said transistor is activated when said second terminal voltage exceeds said first terminal voltage by a predetermined threshold indicative of said first voltage region of said input stimulus to cause said output signal indicator to be at a binary zero level, and wherein said transistor is inactive when said predetermined threshold is not exceeded to cause said output signal indicator to be of a binary one value, said first and second control means responsive to said input stimulus voltage region for varying said transistor terminal voltages and for routing current through said circuit thereby causing said transistor to be activated/inactivated according to said input stimulus.

21. The interface circuit according to claim 20, wherein said transistor comprises a MOSFET.

22. The circuit according to claim 21, further comprising a single voltage supply operative for supplying power to said circuit and coupled to said output terminal via a pull-up resistor for providing said binary one value of said signal indicator at the output terminal when said input stimulus is at said second amplitude region.

23. The circuit of claim 20, wherein said transistor is the only transistor in the circuit.

24. A push-to-talk circuit for use in a radio for selectively enabling communications by providing at an output terminal an output signal voltage of a first level indicative of a first transmission state and a second level corresponding to a second non-transmission state according to the magnitude and polarity of an applied input signal voltage, said circuit comprising:

a FET having gate, source, and drain electrodes, said drain electrode directly coupled to said output terminal, control means coupled to said FET, and responsive to said input signal voltage to provide a plurality of current paths to said FET to cause said FET to conduct in response to the magnitude and polarity of said applied input signal within a first region, and to be non-conducting in response to the magnitude and polarity of said input signal voltage within a second region, wherein said output signal voltage at said drain electrode is at said second level indicative of non-transmission when said FET is conducting, and is at said first level indicative of transmission via said control means when said FET is non-conducting.

25. The circuit of claim 24, wherein said FET is the only FET in the circuit.

26. A circuit for supplying an output signal in a first state or a second state to an output in response to a time-varying input voltage signal selectively applied to an input of the circuit, the circuit comprising:

a field effect transistor (FET) having a gate electrode and first and second terminals coupling the input of the circuit to the output of the circuit such that, when said FET is conducting, the output signal is in the second state;

a first clamping device coupled to the first terminal, said first clamping device clamping the first terminal to a potential of a smaller magnitude than the gate electrode when the input voltage signal applied to the input has a first polarity and the magnitude of the input voltage signal exceeds a predetermined first-polarity threshold, thereby causing said FET to conduct and the output signal to be in the second state;

a second clamping device coupled to the gate electrode, said second clamping device clamping the gate electrode to potential of a smaller magnitude than the first terminal when the input voltage signal applied to the input has a second polarity and the magnitude of the input voltage signal exceeds a predetermined second-polarity threshold, thereby causing said FET to conduct and the output signal to be in the second state;

said first terminal and said gate electrode being coupled to the input of the circuit such that said FET is non-conducting when the applied input voltage signal is between the predetermined first-polarity and second-polarity thresholds; and a power supply coupled to the output of the circuit to place the output signal in the first state when said FET is non-conducting, said power supply being coupled to said first terminal, said gate electrode, and said first and second clamping devices such that, when the input signal voltage is not applied to the input of the circuit, said FET is conducting and the output signal is in the second state.

27. The circuit of claim 26, wherein said FET is the only FET in the circuit.

28. The circuit of claim 26, wherein said FET is an n-type MOSFET, the first polarity is positive, the second polarity is negative, the first terminal is the source of said FET, and the second terminal is the drain of said FET.

29. The circuit of claim 26, wherein said FET is a p-type MOSFET.

30. The circuit of claim 26, wherein said first clamping device is a first diode connecting the first terminal to ground, and said second clamping device is a second diode connecting the gate electrode to ground.

31. The circuit of claim 30, further comprising:

a first resistive element connecting said first terminal to the input of the circuit;

a second resistive element connecting said power supply to the input of the circuit;

a third resistive element connecting said gate electrode to the input of the circuit;

a fourth resistive element connecting said power supply to the output of the circuit; and a third diode connecting the output of the circuit to ground.

* * * * *